(12) United States Patent
Khajeh et al.

(10) Patent No.: US 11,157,115 B2
(45) Date of Patent: Oct. 26, 2021

(54) COMPOSITE COVER MATERIAL FOR SENSITIVITY IMPROVEMENT OF ULTRASONIC TOUCH SCREENS

(71) Applicant: Apple Inc., Cupertino, CA (US)

(72) Inventors: Ehsan Khajeh, San Jose, CA (US); Brian Michael King, Saratoga, CA (US); Marcus Yip, Menlo Park, CA (US); Aaron Scott Tucker, Cupertino, CA (US); Mohammad Yeke Yazdandoost, San Jose, CA (US); Marduke Yousefpor, San Jose, CA (US); Giovanni Gozzini, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/476,244

(22) Filed: Mar. 31, 2017

(65) Prior Publication Data

US 2018/0284947 A1    Oct. 4, 2018

(51) Int. Cl.
*G06F 3/043* (2006.01)
*G06F 3/041* (2006.01)
*G06F 3/039* (2013.01)

(52) U.S. Cl.
CPC ........ *G06F 3/0436* (2013.01); *G06F 3/04142* (2019.05); *G06F 3/04166* (2019.05); *G06F 2203/04103* (2013.01)

(58) Field of Classification Search
CPC ............... G06F 3/0436; G06F 3/0416; G06F 2203/04105
See application file for complete search history.

(56) References Cited

U.S. PATENT DOCUMENTS

| 3,673,327 A | 6/1972 | Johnson |
| 4,506,354 A | 3/1985 | Hansen |

(Continued)

FOREIGN PATENT DOCUMENTS

| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — David Tung
(74) *Attorney, Agent, or Firm* — Kubota & Basol LLP

(57) ABSTRACT

The present disclosure relates to one or more intermediate layers located on a surface of a cover material of an acoustic touch screen. In some examples, the one or more layers can include one or more intermediate layers. The one or more intermediate layers can include a first layer including a plurality of features and a second layer located between the first layer and the cover material. In a touch condition, the touch object can apply a force to the top surface of the acoustic touch sensor. The applied force can create one or more local bends causing the plurality of features to move closer to the cover material and causing one or more surface discontinuities in the cover material. The acoustic waves can undergo reflections (e.g., causing the signal to be attenuated) due to the discontinuities located in the path of the wave propagation.

25 Claims, 10 Drawing Sheets

(56) References Cited

U.S. PATENT DOCUMENTS

| | | | |
|---|---|---|---|
| 4,746,914 A | 5/1988 | Adler | |
| 4,825,212 A | 4/1989 | Adler | |
| 5,451,723 A * | 9/1995 | Huang | G06F 3/0436 |
| | | | 178/18.04 |
| 5,483,261 A | 1/1996 | Yasutake | |
| 5,488,204 A | 1/1996 | Mead et al. | |
| 5,591,945 A | 1/1997 | Kent | |
| 5,648,643 A * | 7/1997 | Knowles | G06F 3/0436 |
| | | | 178/18.04 |
| 5,766,493 A | 6/1998 | Shin | |
| 5,816,225 A | 10/1998 | Koch | |
| 5,825,352 A | 10/1998 | Bisset et al. | |
| 5,835,079 A | 11/1998 | Shieh | |
| 5,854,450 A | 12/1998 | Kent | |
| 5,880,411 A | 3/1999 | Gillespie et al. | |
| 6,078,315 A | 6/2000 | Huang | |
| 6,091,406 A | 7/2000 | Kambara | |
| 6,188,391 B1 | 2/2001 | Seely et al. | |
| 6,225,985 B1 | 5/2001 | Armstrong | |
| 6,229,529 B1 | 5/2001 | Yano | |
| 6,310,610 B1 | 10/2001 | Beaton et al. | |
| 6,323,846 B1 | 11/2001 | Westerman et al. | |
| 6,327,011 B2 | 12/2001 | Kim | |
| 6,459,424 B1 * | 10/2002 | Resman | G06F 3/044 |
| | | | 345/173 |
| 6,467,138 B1 * | 10/2002 | Aime | G10K 11/002 |
| | | | 29/25.35 |
| 6,690,387 B2 | 2/2004 | Zimmerman et al. | |
| 6,856,259 B1 | 2/2005 | Sharp | |
| 7,015,894 B2 | 3/2006 | Morohoshi | |
| 7,079,118 B2 | 7/2006 | Benard | |
| 7,098,891 B1 | 8/2006 | Pryor | |
| 7,184,064 B2 | 2/2007 | Zimmerman et al. | |
| 7,489,308 B2 | 2/2009 | Blake | |
| 7,499,039 B2 | 3/2009 | Roberts | |
| 7,573,466 B1 | 8/2009 | Marzen | |
| 7,663,607 B2 | 2/2010 | Hotelling et al. | |
| 7,683,890 B2 | 3/2010 | Geaghan | |
| 7,907,129 B2 | 3/2011 | Idzik | |
| 7,952,568 B2 | 5/2011 | Ishii | |
| 8,077,162 B2 * | 12/2011 | Endo | G06F 3/0488 |
| | | | 178/18.01 |
| 8,169,404 B1 | 5/2012 | Boillot | |
| 8,479,122 B2 | 7/2013 | Hotelling et al. | |
| 8,743,091 B2 | 6/2014 | Bernstein | |
| 9,307,325 B2 * | 4/2016 | Kent | H04B 11/00 |
| 2002/0135570 A1 * | 9/2002 | Iisaka | G06F 1/1626 |
| | | | 345/177 |
| 2002/0167270 A1 * | 11/2002 | Siwinski | G06F 3/041 |
| | | | 313/506 |
| 2004/0164970 A1 | 8/2004 | Benard | |
| 2005/0017959 A1 | 1/2005 | Kraus | |
| 2005/0052432 A1 | 3/2005 | Kraus | |
| 2005/0083313 A1 | 4/2005 | Hardie-bick | |
| 2005/0248548 A1 | 11/2005 | Tsumura | |
| 2006/0197753 A1 | 9/2006 | Hotelling | |
| 2007/0165009 A1 * | 7/2007 | Sakurai | G06F 3/0412 |
| | | | 345/177 |
| 2007/0171212 A1 * | 7/2007 | Sakurai | G06F 3/0412 |
| | | | 345/177 |
| 2007/0171326 A1 * | 7/2007 | Taguchi | G02F 1/13338 |
| | | | 349/63 |
| 2007/0176907 A1 * | 8/2007 | Ishii | G06F 3/0436 |
| | | | 345/177 |
| 2007/0211031 A1 | 9/2007 | Marc | |
| 2007/0240913 A1 | 10/2007 | Schermerhorn | |
| 2008/0030485 A1 * | 2/2008 | Endo | G06F 3/0436 |
| | | | 345/177 |
| 2008/0059761 A1 | 3/2008 | Norman | |
| 2008/0114251 A1 | 5/2008 | Weymer | |
| 2008/0266266 A1 | 10/2008 | Kent | |
| 2008/0291177 A1 * | 11/2008 | Kuo | G06F 3/0412 |
| | | | 345/175 |
| 2010/0277426 A1 * | 11/2010 | Han | G06F 3/0421 |
| | | | 345/173 |
| 2011/0291996 A1 * | 12/2011 | Gao | G06F 3/0436 |
| | | | 345/177 |
| 2015/0055032 A1 * | 2/2015 | Kato | G02F 1/13338 |
| | | | 349/12 |
| 2015/0097814 A1 * | 4/2015 | Lynn | G06F 3/0436 |
| | | | 345/177 |
| 2016/0107194 A1 * | 4/2016 | Panchawagh | H01L 41/047 |
| | | | 367/140 |
| 2016/0349879 A1 * | 12/2016 | Wang | G06F 3/0421 |

FOREIGN PATENT DOCUMENTS

| | | | | |
|---|---|---|---|---|
| WO | 2005103872 A2 | 11/2005 | | |
| WO | WO-2008020699 A1 * | 2/2008 | | G06F 3/0436 |
| WO | WO-2015/41640 A2 | 3/2015 | | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Aug. 27, 2013, for U.S. Appl. No. 12/184,232, filed Jul. 31, 2008, 25 pages.

Final Office Action dated Feb. 20, 2013, for U.S. Appl. No. 12/184,232, filed Jul. 31, 2008, 24 pages.

Non-Final Office Action dated Jul. 25, 2012, for U.S. Appl. No. 12/184,232, filed Jul. 31, 2008, 18 pages.

Non-Final Office Action dated Nov. 18, 2011, for U.S. Appl. No. 12/184,232, filed Jul. 31, 2008, 21 pages.

Notice of Allowance dated Mar. 14, 2014, for U.S. Appl. No. 12/184,232, filed Jul. 31, 2008, eight pages.

* cited by examiner

COMPOSITE COVER MATERIAL FOR SENSITIVITY IMPROVEMENT OF ULTRASONIC TOUCH SCREENS

FIELD OF THE DISCLOSURE

This relates generally to sensing user contact with a device, and more particularly, to an acoustic (e.g., ultrasonic) touch screen including a composite cover material with improved sensitivity for detecting a touch object.

BACKGROUND OF THE DISCLOSURE

Many types of input devices are presently available for performing operations in a computing system, such as buttons or keys, mice, trackballs, joysticks, touch sensor panels, touch screens, and the like. Touch screens, in particular, are becoming increasingly popular because of their ease and versatility of operation as well as their declining price. Touch screens can include a touch sensor panel, which can be a clear panel with a touch-sensitive surface and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus, or other object at a location often dictated by a user interface (UI) being displayed by the display device. In general, touch screens can recognize a touch and the position of the touch on the touch sensor panel. The computing system can then interpret the touch in accordance with the display appearing at the time of the touch, and thereafter can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

SUMMARY OF THE DISCLOSURE

The present disclosure relates to one or more intermediate layers located on a surface of a cover material of an acoustic touch screen. Acoustic touch sensing can utilize transducers, such as piezoelectric transducers, to transmit ultrasonic acoustic waves along a surface or through the thickness of an electronic device. As the wave propagates through the material that comprises the surface, one or more objects in contact with the surface and/or discontinuities in the surface can disrupt the wave, attenuating and/or reflecting a portion of the transmitted wave. Portions of the transmitted wave energy after disruption by the one or more objects can be measured to determine the touch location(s) of the one or more objects on the device. For example, a transmitted wave can encounter a finger touching a surface of the device. A portion of the wave can be reflected by the finger and detected by one or more receivers. In the immediately preceding example, the location of the object can be determined based on the amount of time elapsing between the transmission of the wave and the detection of the reflected wave. In some examples, acoustic energy can be transmitted through the thickness of the material. The acoustic energy can be reflected at the interface between the material and air if no finger is present, or the acoustic energy can be reflected at the interface between the material and a finger. In the above example, the finger (if present) can absorb a portion of the acoustic energy, and differences in reflected energy can be used to determine whether a finger is present. Acoustic touch sensing can be used instead of, or in conjunction with, other touch sensing techniques, such as resistive, optical, and/or capacitive touch sensing.

In some examples, the one or more layers can include one or more intermediate layers. The one or more intermediate layers can include a first layer including a plurality of features and a second layer located between the first layer and the cover material. Each feature can be any type of protrusion configured to transfer force applied by the touch object to the cover material. In a no-touch condition, the second layer can act to separate the plurality of features from the cover material. In a touch condition, the touch object can apply a force to the top surface of the acoustic touch sensor. The applied force can cause a change in at least some of the properties of intermediate layer. For example, the force can create one or more local bends in the intermediate layer where the plurality of features is located. The plurality of features can move closer to the cover material and can cause one or more surface discontinuities in the cover material. The acoustic waves can undergo reflections (e.g., causing the signal to be attenuated) due to the discontinuities located in the path of the wave propagation. Time-of-flight information can be measured for purposes of determining touch location.

DETAILED DESCRIPTION

Figure 1A:
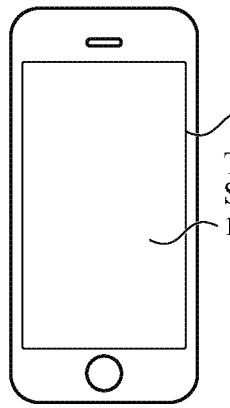
FIGS. 1A-1E illustrate examples of systems that can include an acoustic touch sensing system according to examples of the disclosure.

In the following description of various examples, reference is made to the accompanying drawings which form a part hereof, and in which it is shown by way of illustration specific examples that can be practiced. It is to be understood that other examples can be used and structural changes can be made without departing from the scope of the various examples.

The present disclosure relates to one or more intermediate layers located on a surface of a cover material of an acoustic touch screen. Acoustic touch sensing can utilize transducers, such as piezoelectric transducers, to transmit ultrasonic acoustic waves along a surface or through the thickness of an electronic device. As the wave propagates through the material that comprises the surface, one or more objects in contact with the surface and/or discontinuities in the surface can disrupt the wave, attenuating and/or reflecting a portion of the transmitted wave. Portions of the transmitted wave energy after disruption by the one or more objects can be measured to determine the touch location(s) of the one or more objects on the device. For example, a transmitted wave can encounter a finger touching a surface of the device. A portion of the wave can be reflected by the finger and detected by one or more receivers. In the immediately preceding example, the location of the object can be determined based on the amount of time elapsing between the transmission of the wave and the detection of the reflected wave. In some examples, acoustic energy can be transmitted through the thickness of the material. The acoustic energy can be reflected at the interface between the material and air if no finger is present, or the acoustic energy can be reflected at the interface between the material and a finger. In the above example, the finger (if present) can absorb a portion of the acoustic energy, and differences in reflected energy can be used to determine whether a finger is present. Acoustic touch sensing can be used instead of, or in conjunction with, other touch sensing techniques, such as resistive, optical, and/or capacitive touch sensing.

In some examples, the one or more layers can include one or more intermediate layers. The one or more intermediate layers can include a first layer including a plurality of features and a second layer located between the first layer and the cover material. Each feature can be any type of protrusion configured to transfer force applied by the touch object to the cover material. In a no-touch condition, the second layer can act to separate the plurality of features from the cover material. In a touch condition, the touch object can apply a force to the top surface of the acoustic touch sensor. The applied force can cause a change in at least some of the properties of intermediate layer. For example, the force can create one or more local bends in the intermediate layer where the plurality of features is located. The plurality of features can move closer to the cover material and can cause one or more surface discontinuities in the cover material. The acoustic waves can undergo reflections (e.g., causing the signal to be attenuated) due to the discontinuities located in the path of the wave propagation. Time-of-flight information can be measured for purposes of determining touch location.

Figure 1B:
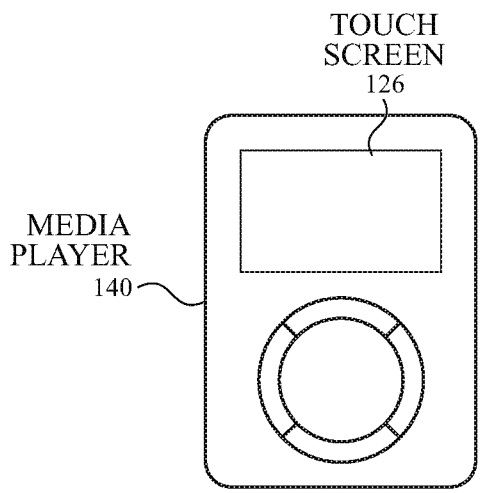
Figure 1C:
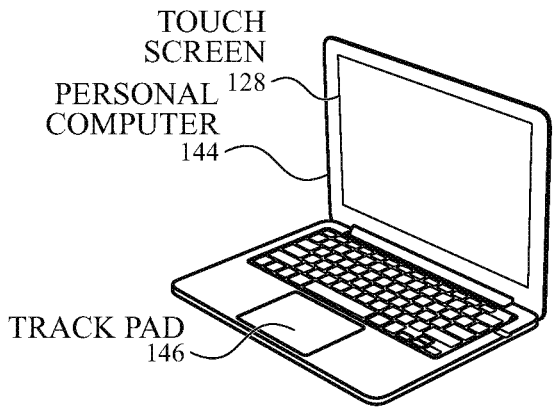
Figure 1D:
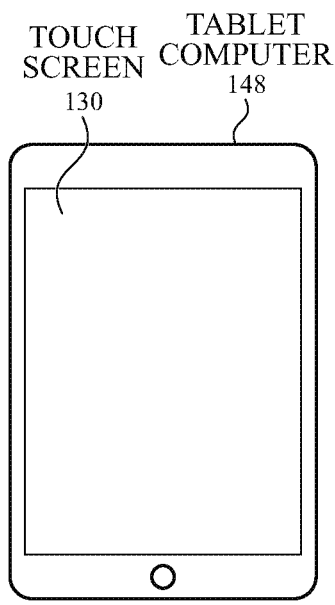
Figure 1E:
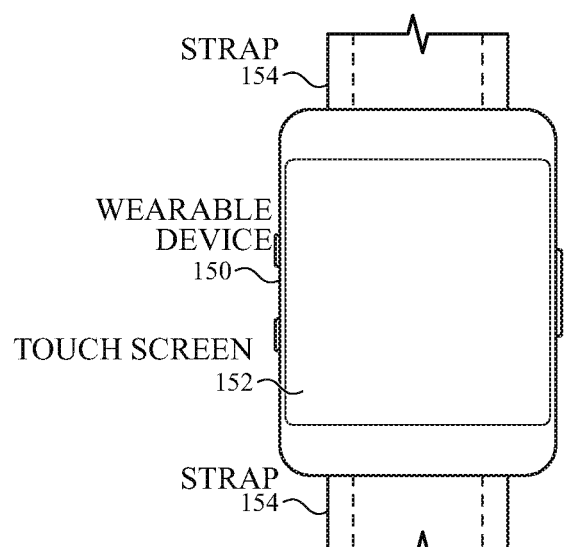

FIGS. 1A-1E illustrate examples of systems with touch screens that can include acoustic sensors for detecting contact between an object (e.g., a user's finger or palm) and the system. FIG. 1A illustrates an exemplary mobile telephone 136 that includes a touch screen 124 and can include an acoustic touch sensing system according to examples of the disclosure. FIG. 1B illustrates an example digital media player 140 that includes a touch screen 126 and can include an acoustic touch sensing system according to examples of the disclosure. FIG. 1C illustrates an example personal computer 144 that includes a touch screen 128 and can include an acoustic touch sensing system according to examples of the disclosure. FIG. 1D illustrates an example tablet computing device 148 that includes a touch screen 130 and can include an acoustic touch sensing system according to examples of the disclosure. FIG. 1E illustrates an example wearable device 150 (e.g., a watch) that includes a touch screen 152 and can include an acoustic touch sensing system according to examples of the disclosure. Wearable device 150 can be coupled to a user via strap 154 or any other suitable fastener. It should be understood that the example devices illustrated in FIGS. 1A-1E are provided by way of example, and other types of devices can include an acoustic touch sensing system for detecting contact between an object (e.g., a user's finger or palm) and the device. Additionally, although the devices illustrated in FIGS. 1A-1E include touch screens, in some examples, the devices may have a non-touch sensitive display.

Figure 2:
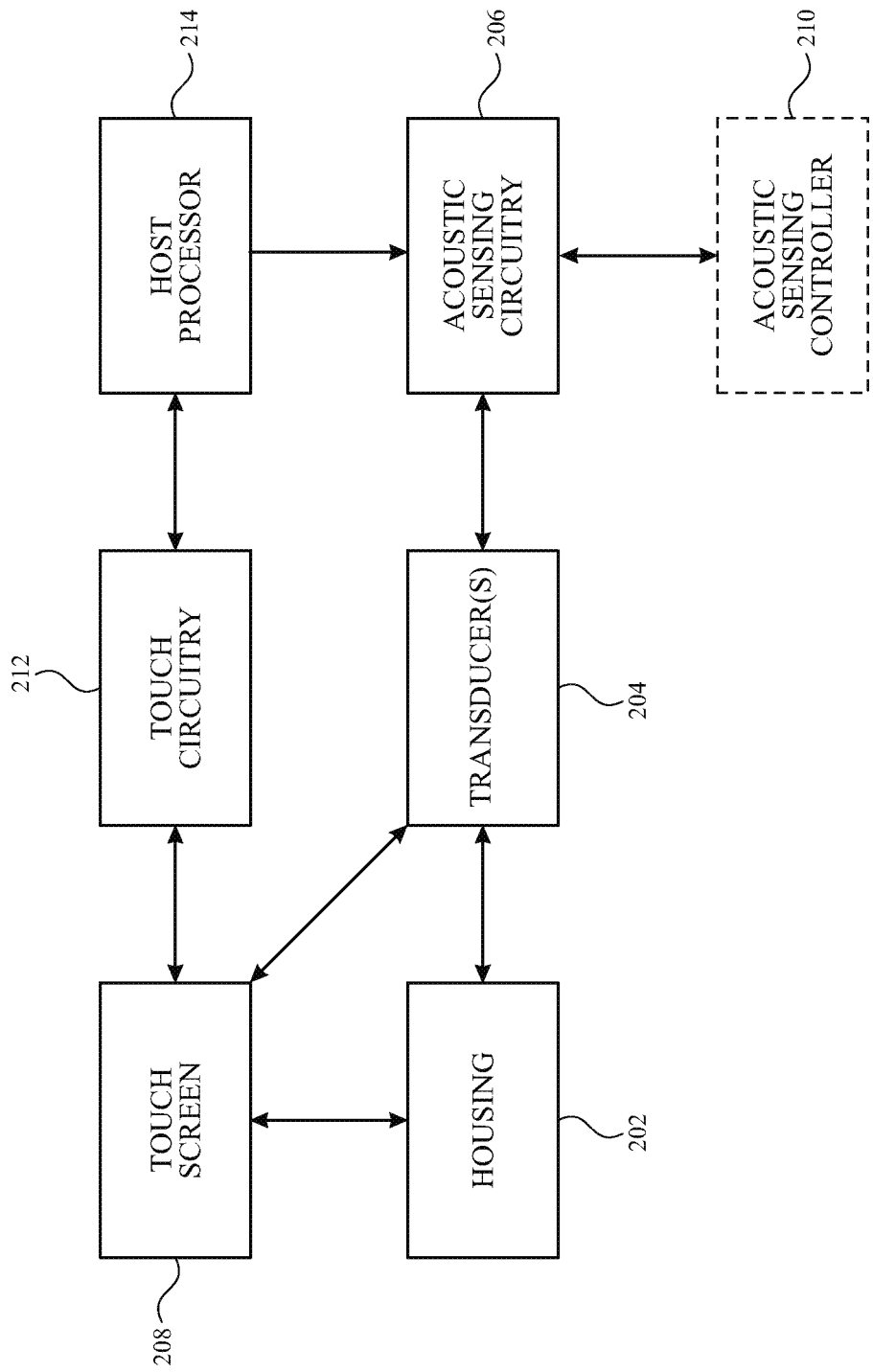
FIG. 2 illustrates a block diagram of a device that includes an exemplary acoustic touch sensing system according to examples of the disclosure.

FIG. 2 illustrates an exemplary block diagram of components that can exist within a device that includes an acoustic touch sensing system according to examples of the disclosure. In some examples, housing 202 of the device (which can correspond to devices 136, 140, 144, 148, and 150 illustrated in FIGS. 1A-1E) can be coupled with one or more acoustic transducers 204. In some examples, transducers 204 can be piezoelectric transducers, which can be configured to vibrate by the application of electrical signals. In some examples, the transducers 204 can be made of a piezoelectric ceramic material (e.g., PZT or KNN) or a piezoelectric plastic material (e.g., PVDF). Similarly, transducers 204 can produce electrical energy as an output when vibrated. In some examples, the transducers 204 can be bonded to the housing 202 by a bonding agent (e.g., a thin layer of stiff epoxy). In some examples, the transducers 204 can be deposited on the surface through processes such as deposition, lithography, or the like. In some examples, the transducers 204 can be bonded to the surface using conductive or non-conductive bonding materials. When electrical energy applied to the transducers 204 causes the transducers to vibrate, the surface material in contact with the transducers can also vibrate. The vibrations of the molecules of the surface material can propagate as a wave through the surface material. In some examples, vibration of the transducers 204 can be used to produce ultrasonic acoustic waves at a selected frequency over a broad frequency range (e.g., 500 kHz-10 MHz) in the medium of the surface of the electronic device, which can be metal, plastic, glass, wood, or the like. It should be understood that other frequencies outside of the exemplary range above can be used while remaining within the scope of the present disclosure.

In some examples, transducers 204 can also be partially or completely disposed on a portion of a touch screen 208. For example, the touch screen 208 may comprise a cover material (e.g., glass panel), and a display region of the touch screen may be surrounded by a non-display region (e.g., an opaque border region surrounding the periphery of the display region of the touch screen). In some examples, transducers 204 can be disposed partially or completely in the opaque mask region of the touch screen 208 glass panel (e.g., on the back side of the glass panel behind the opaque mask) such that the transducers are not visible (or are only partially visible) to a user. The device can further comprise acoustic touch sensing circuitry 206, which can include circuitry for driving electrical signals to stimulate vibration of the transducers 204 (e.g., transmit circuitry), as well as circuitry for sensing electrical signals output by the transducers (e.g., receive circuitry) when the transducer is stimulated by received acoustic energy. In some examples, timing operations for the acoustic touch sensing circuitry 206 can optionally be provided by a separate acoustic touch sensing controller 210 that can control timing of acoustic touch sensing circuitry 206 operations. In some examples, controller functions can be integrated with the acoustic touch sensing circuitry 206 (e.g., on a single integrated circuit). Output data from acoustic touch sensing circuitry 206 can be output to a host processor 214 for further processing to determine a location of an object contacting the device, as described in more detail below. In some examples, the processing for determining the location of a contacting object can be performed by the acoustic touch sensing circuitry 206 or a separate sub-processor of the device (not shown).

In addition to acoustic touch sensing, the device can include additional touch circuitry 212 that can be coupled to the touch screen 208. The touch circuitry 212 can, for example, be capacitive or resistive touch sensing circuitry and can be used to detect contact and/or hovering of objects (e.g., fingers) in contact with and/or in proximity to the touch screen 208, particularly in the display region of the touch sensor. Thus, the device can include multiple types of sensing circuitry (e.g., touch circuitry 212 and acoustic touch sensing circuitry 206) for detecting objects (and their positions) in different regions of the device and/or for different purposes, as described in more detail below.

Figure 3:
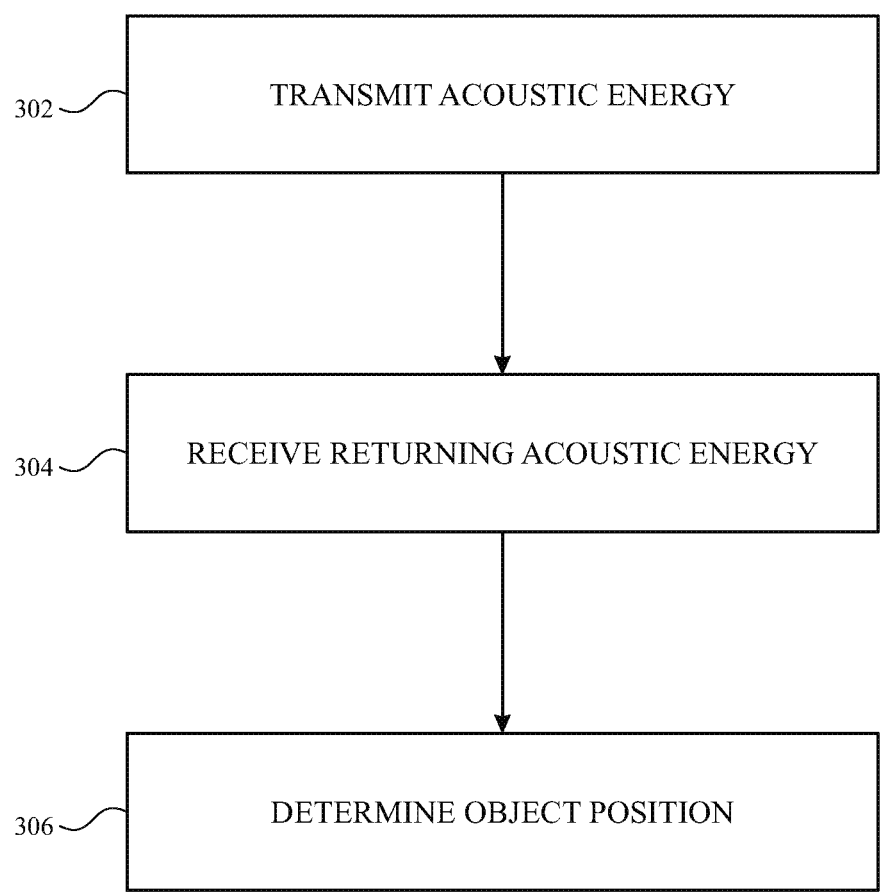
FIG. 3 illustrates an exemplary method for acoustic touch sensing of an object contact position according to examples of the disclosure.

FIG. 3 illustrates an exemplary method for acoustic touch sensing of an object contact position according to examples of the disclosure. At step 302, acoustic energy can be transmitted (e.g., by transducers 204 illustrated in FIG. 2) along a surface of a device, or through the thickness of a device housing, for example in the form of an ultrasonic acoustic wave. In some examples, the wave can propagate as a compressive wave, a shear horizontal wave, a Rayleigh wave, a Lamb wave, a Love wave, or a surface acoustic wave. Other propagation modes for the transmitted acoustic energy can also exist based on the properties of the surface material and the manner of energy transmitted from the transducers to the surface of the device. In some examples, the surface (e.g., touch screen 208 and/or housing 202 illustrated in FIG. 2) can be made of glass, metal, plastic, or wood. Transmitted energy can propagate along the surface until a discontinuity in the surface is reached, which can cause a portion of the energy to reflect. In some examples, a discontinuity can be an irregularity in the surface shape of the surface, e.g., a groove or pattern etched into the surface. In some examples, a discontinuity can be a reflective material attached to the surface. In some examples, an object in contact with the surface (e.g., a user's finger or palm) can also be a discontinuity. In some examples, a discontinuity can occur at edges of the surface material. When the transmitted energy reaches one of the discontinuities described above, some of the energy can be reflected, and a portion of the reflected energy can be directed to the transducers (e.g., transducers 204 illustrated in FIG. 2). In some examples, water in contact with the surface of the device may not act as a discontinuity to the acoustic waves, and thus the acoustic touch sensing method can be effective for detecting the presence of an object (e.g., a user's finger or palm) even in the presence of water drops on the surface of the device or even while the device is fully submerged.

At step 304, the method can receive returning acoustic energy, and the acoustic energy can be converted to an electrical signal by the transducers (e.g., transducers 204 illustrated in FIG. 2). At step 306, the method can determine whether an object is contacting the surface of the device and can further detect the position of one or more objects based on the received acoustic energy. In some examples, a distance of the object from the transmission source (e.g., transducers) can be determined from a time-of-flight and a propagation rate of the ultrasonic acoustic wave in the material. Time-of-flight information can be time between transmission at step 302 and receiving of reflected energy at step 304. In some examples, baseline reflected energy from one or more intentionally included discontinuities (e.g., barriers, ridges, grooves, boundaries between different materials, etc.) can be compared to a measured value of reflected energy. The baseline reflected energy can be determined during a measurement when no object (e.g., finger) is in contact with the surface. Timing of measured deviations of the reflected energy from the baseline can be correlated with a location of the object. Exemplary device configurations and measurement timing examples that can be used to implement the method are described in further detail below.

Figure 4:
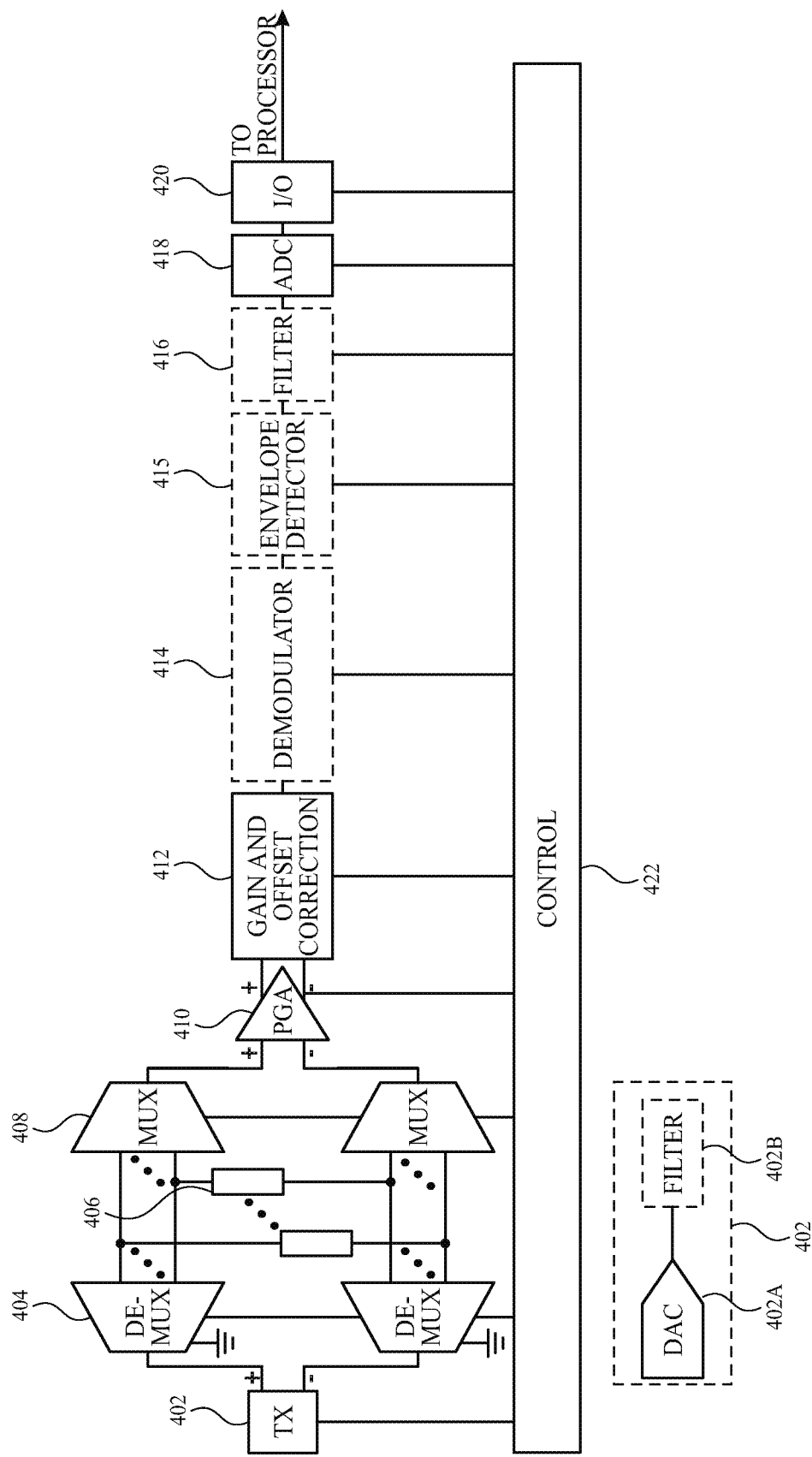
FIG. 4 illustrates an exemplary configuration of acoustic touch sensing circuitry, control logic, and transducers according to examples of the disclosure.

FIG. 4 illustrates an exemplary configuration of acoustic touch sensing circuitry 402-404 and 408-420 (which can correspond to acoustic touch sensing circuitry 206 above), control logic 422 (which can correspond to acoustic touch sensing controller 210 above) and transducers 406 (which can correspond to transducers 204 above) according to examples of the disclosure. In some examples, a transmitter 402 can generate an electrical signal for stimulating movement of one or more of a plurality of transducers 406. In some examples, the transmitted signal can be a differential signal, and in some examples the transmitted signal can be a single-ended signal. In some examples, the transmitter 402 can be a simple buffer, and the transmitted signal can be a pulse (or burst of pulses at a particular frequency). In some examples, the transmitter 402 can comprise a digital-to-analog converter (DAC) 402A and an optional filter 402B that can be optionally used to smooth a quantized output of DAC 402A. The DAC 402A can be used to generate an arbitrary transmit waveform. In some examples, the arbitrary waveform can pre-distort the transmit signal to equalize the channel. In some examples, the characteristics of each channel, such as the properties of the surface material coupled to transducers 406, the discontinuities in the surface material, and the reflection characteristics of an edge of the device can be measured and stored. In some examples, the channel characteristics can be measured as a manufacturing step (or factory calibration step), and in other examples the characteristics can be measured as a periodic calibration step (i.e., once a month, once a year, etc. depending on how quickly the channel characteristics are expected to change). In some examples, the channel characteristics can be converted to a transfer function of the channel, and the arbitrary transmit waveform can be configured using the inverse of the channel transfer function such that the returning signal is equalized (e.g., returning signal can be detected as a pulse or a burst of pulses despite the transmitted waveform having a seemingly arbitrary waveform).

A pair of demultiplexers 404 (e.g., in a differential implementation) can be used to selectively couple the transmitter 402 to one of the transducers 406 that can be the active transducer for a particular measurement cycle. In some examples, the demultiplexers 404 can have a ground connection, and the non-selected demultiplexer outputs can be shorted, open, or grounded. As described above, transducers 406 can also generate output electrical signals when motion is induced in the transducers by acoustic energy. A pair of multiplexers 408 (e.g., in a differential implementation) can be used to select a transducer 406 for coupling to a programmable gain amplifier 410 configured to amplify the received signals. In some examples, the same transducer 406 can be coupled to the transmitter 402 by the demultiplexers 404 and coupled to the programmable gain amplifier 410 by the multiplexers 408. Thus, a single transducer 406 can be used both for transmitting and for receiving acoustic energy. In some examples, a first transducer can be coupled to the transmitter 402 by the demultiplexers and a second transducer can be coupled by the multiplexers to the programmable gain amplifier 410. For example, the transmitting transducer and the receiving transducer can be discrete piezoelectric elements, where the transmitting transducer can be designed for being driven by higher voltages (or currents) to produce sufficient motion in the transducer 406 to generate an acoustic wave in the surface of a device (e.g., device 200 above), and the receiving transducer can be designed for receiving smaller amplitude reflected energy. In such an architecture, the transmit side circuitry (e.g., 402 and 404) can be optionally implemented in a high-voltage process, and the receive side circuitry (e.g., 408-420) can be optionally implemented on a separate low-voltage process. In some examples, the programmable gain amplifier output can be coupled to gain and offset correction circuit 412. It should be understood that for a single-ended implementation, a single demultiplexer 404 and a single multiplexer 408 can be used, and transmitter 402, programmable gain amplifier 410, and the input to gain and offset correction circuit 412 can be single-ended as well.

In some examples, the output of gain and offset correction circuit 412 can optionally be coupled to one or more analog processing circuits. In some examples the output of gain and offset correction circuit 412 can be coupled to a demodulation circuit 414 configured to demodulate the received signals (e.g., by I/Q demodulation). In some examples, the output of the gain and offset correction circuit 412 can be coupled to an envelope detection circuit 415 configured to perform envelope detection on the received signals. In some examples, the output of gain and offset correction circuit 412 can be filtered at a filter 416.

The received signals, whether raw or processed by one or more of the demodulation circuit 414, envelope detection circuit 415 or filter 416 can be passed to an analog-to-digital converter (ADC) 418 for conversion to a digital signal. In some examples, an input/output (I/O) circuit 420 can be used to transmit received data for processing. In some examples, the output of I/O circuit 420 can be transferred to a host processor of the device, or to an auxiliary sub-processor separate from the host processor. In some examples, some digital signal processing can be performed (e.g., by the acoustic touch sensing circuitry or acoustic touch sensing controller) before transmitting the data to other processors in the system. A control circuit 422 can be used to control timing and operations of the acoustic touch sensing circuitry 402-420.

It is to be understood that the configuration of FIG. 4 is not limited to the components and configuration of FIG. 4, but can include other or additional components in multiple configurations according to various examples. Additionally, some or all of the components 402-404 and 408-420 can be included in a single circuit, or can be divided among multiple circuits while remaining within the scope of the examples of the disclosure.

Figure 5A:
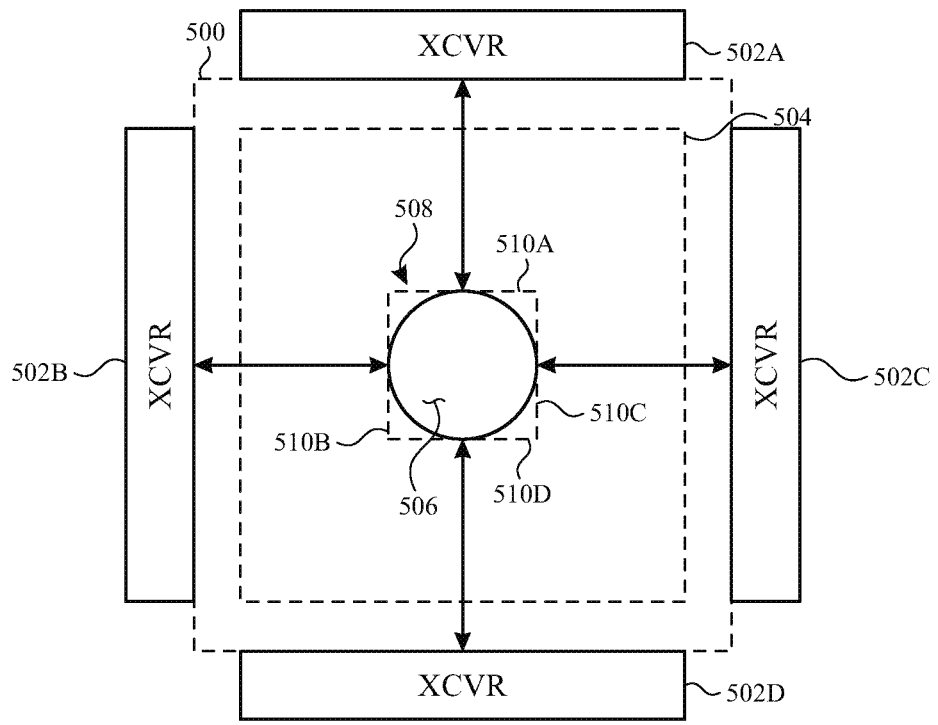
FIGS. 5A-5E illustrate exemplary acoustic touch sensing system configurations using a bounding box technique to determine position according to examples of the disclosure.

As described herein, various acoustic sensing techniques can be used to determine position of an object touching a surface. In some examples, one or more time-of-flight (TOF) measurements can be performed using one or more acoustic transmitters/receivers/transceivers to determine boundaries of the position that the object is touching. FIGS. 5A-5D illustrate exemplary acoustic touch sensing system configurations using a bounding box technique to determine position according to examples of the disclosure. FIG. 5A illustrates an exemplary acoustic touch sensing system configuration using four acoustic transceivers 502A-D mounted along (or otherwise coupled to) four edges of a cover material 500 (e.g., cover glass). Transceivers 502A-D can be configured to generate acoustic waves (e.g., shear horizontal waves) and to receive the reflected acoustic waves. Propagation of shear horizontal waves can be unaffected by water on cover material 500 because low viscosity fluids and gases (such as water and air) can have a very low shear modulus, and therefore do not perturb the boundary conditions that affect wave propagation. Shear horizontal waves can be highly directional waves such that the active detection region (or active area) 504 can be effectively defined based on the position and dimensions of the acoustic transceivers 502A-D. It should be understood, however, that the active area can change based on the directionality property of the acoustic waves and the size and placement of acoustic transceivers 502A-D. Additionally, it should be understood that although illustrated as transceivers, in some examples, the transmit and receive functions can be divided (e.g., a first transducer can be configured for transmitting and a second transducer can be configured for receiving rather than including a single transceiver transducer configured for both transmitting and receiving).

The position of a touch 506 from an object in contact with surface 502 can be determined by calculating TOF measurements in a measurement cycle using each of acoustic transceivers 502A-D. For example, in a first measurement step of the measurement cycle, acoustic transceiver 502A can transmit an acoustic wave and receive reflections from the acoustic wave. When no object is present, the received reflection can be the reflection from the acoustic wave reaching the opposite edge of cover material 500. However, when an object is touching cover material 500 (e.g., corresponding to touch 506), a reflection corresponding to the object can be received before receiving the reflection from the opposite edge. Based on the received reflection corresponding to the object received at transceiver 502A, the system can determine a distance to the edge of touch 506, marked by boundary line 510A. Similar measurements can be performed by transceivers 502B, 502C, and 502D to determine a distance to the remaining edges of touch 506, indicated by boundary lines 510B, 510C, and 510D. Taken together, the measured distances as represented by boundary lines 510A-510D can form a bounding box 508. Based on the bounding box, the acoustic touch sensing system can determine position of touch 506 (e.g., based on a centroid of the bounding box).

Figure 5B:
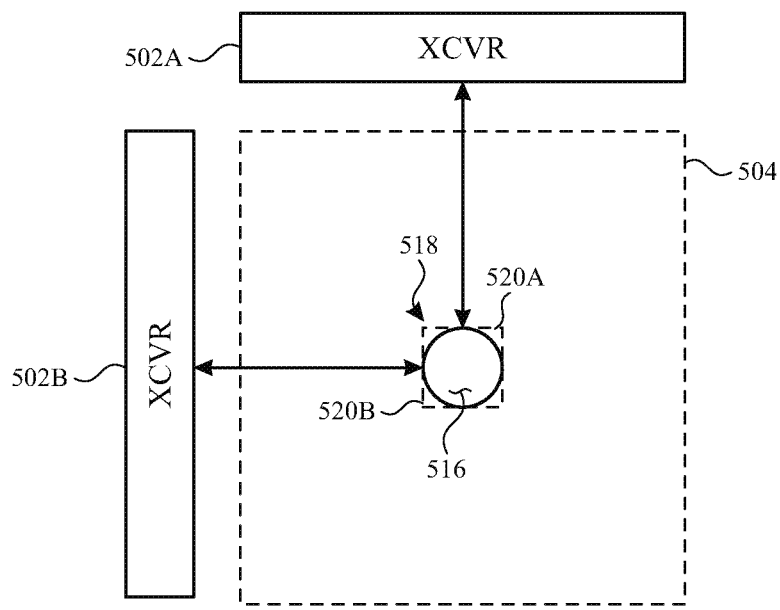
Figure 5C:
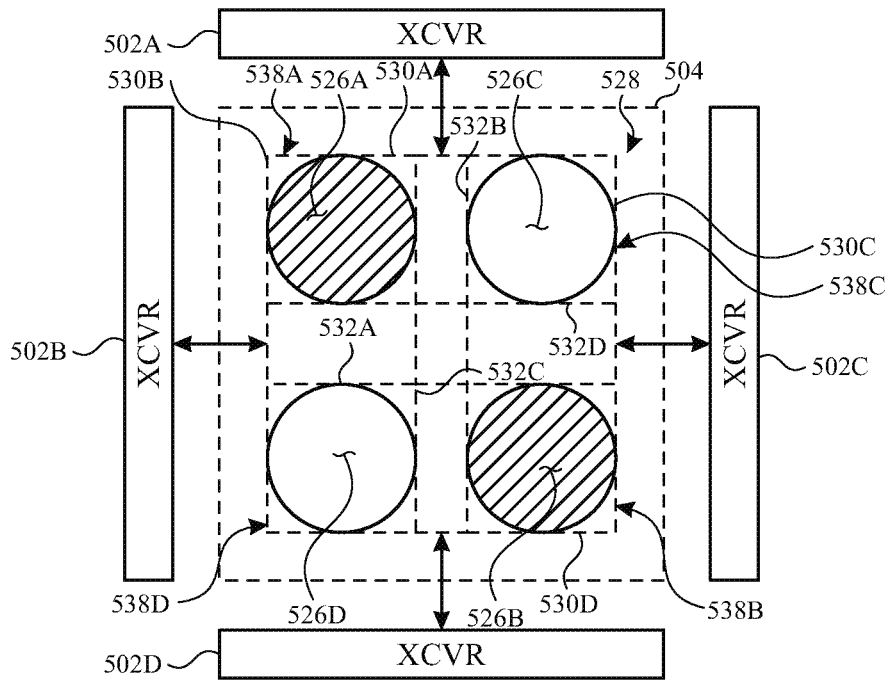
Figure 5D:
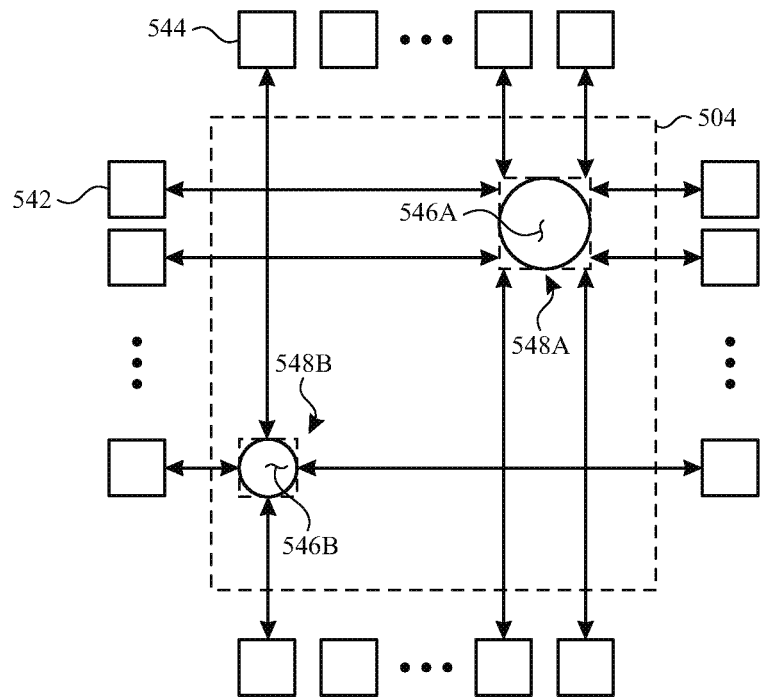
Figure 5E:
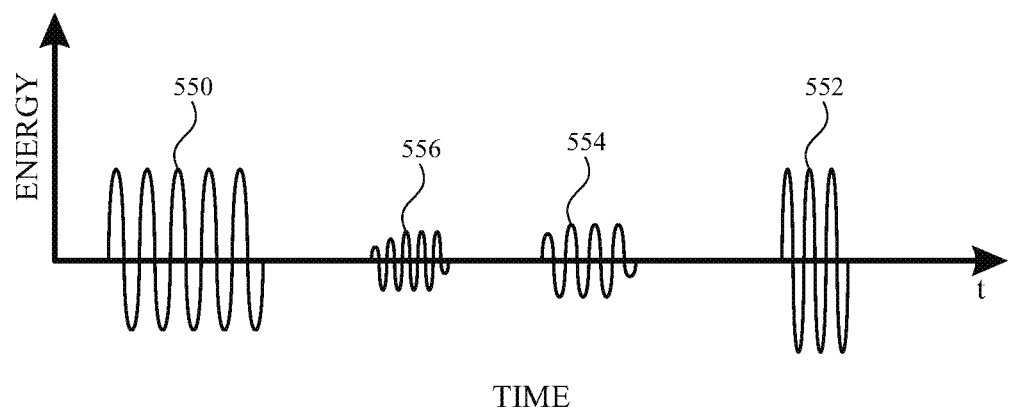

The distance between an object touching the surface and a transceiver can be calculated based on TOF principles. The acoustic energy received by transceivers can be used to determine a timing parameter indicative of a leading edge of a touch. The propagation rate of the acoustic wave through the material forming the surface can be a known relationship between distance and time. Taken together, the known relationship between distance and time and the timing parameter can be used to determine distance. FIG. 5E illustrates an exemplary timing diagram according to examples of the disclosure. FIG. 5E illustrates the transducer's signal amplitude. Signal 550 can correspond to the acoustic energy at the transducer from the generation of the acoustic wave at a first edge of the surface. Signal 552 can correspond to the acoustic energy at the transducer received from the wave reflected off the opposite edge of the surface. Due to the known distance across the surface from the first edge to the opposite edge and the known or measured propagation rate of the acoustic signal, the reflection off the opposite edge of the surface occurs at a known time. Additionally, one or more objects (e.g., fingers) touching the surface can cause reflections of energy in the time between the generation of the wave and the edge reflection (i.e., between signals 550 and 552). For example, signals 556 and 554 can correspond to reflections of objects touching the surface. It should be understood that signals 550-556 are exemplary and the actual shape of the energy received can be different.

In some examples, the timing parameter can be a moment in time that can be derived from the reflected energy. For example, the time can refer to that time at which a threshold amplitude of a packet of the reflected energy is detected. In some examples, rather than a threshold amplitude, a threshold energy of the packet of reflected energy can be detected, and the time can refer to that time at which a threshold energy of the packet is detected. The threshold amplitude or threshold energy can indicate the leading edge of the object in contact with the surface. In some examples, the timing parameter can be a time range rather than a point in time. To improve the resolution of a TOF based sensing scheme, the frequency of the ultrasonic wave and sampling rate of the receivers can be increased (e.g., so that receipt of the reflected wave can be localized to a narrower peak that can be more accurately correlated with a moment in time).

In some examples, transceivers 502A-D can operate in a time multiplexed manner, such that each transceiver transmits and receives an acoustic wave at a different time during a measurement cycle so that the waves from one transceiver do not interfere with waves from another transceiver. In other examples, the transceivers can operate in parallel or partially in parallel in time. The signals from the respective transceivers can then be distinguished based on different characteristics of the signals (e.g., different frequencies, phases and/or amplitudes).

Although four transceivers are illustrated in FIG. 5A, in some examples, fewer transceivers can be used. For example, when using an input object with known dimensions, as few as two transceivers can be used. FIG. 5B illustrates an exemplary acoustic touch sensing system configuration using two acoustic transceivers 502A and 50B mounted along two perpendicular edges (e.g., one horizontal edge and one vertical edge) of a cover material 500 (cover material 500 is omitted for clarity of illustration). An object in contact within the active region 504 of the surface (represented by touch 516) can be an object with known dimensions. For example, a stylus tip can have a known size and shape (e.g., a diameter of 1-2 mm). As described above with respect to FIG. 5A, a first distance illustrated by boundary line 520A can be measured by the TOF of an acoustic wave transmitted and received by transceiver 502A, and a second distance illustrated by boundary line 520B can be measured by the TOF of an acoustic wave transmitted and received by transceiver 502B. Based on the known dimensions of object, bounding box 518 can be formed (e.g., by adding the diameter of object to the first and second distances). Based on the bounding box, the acoustic touch sensing system can determine position of touch 516 (e.g., based on a centroid). In some examples, the position can be determined based on the two measured distances without requiring forming the bounding box (e.g., the position estimating algorithm can use the dimensions of the object and the two measured distances to calculate the centroid).

In some examples, a user's finger(s) can be characterized such that a two transceiver scheme can be used to detect touches by one or more fingers. In some examples, user input can be primarily from an index finger. The user's index finger can be characterized (e.g., dimensions or size) and the bounding box scheme can be applied to two TOF measurements and the finger dimensions. In some examples, multiple fingers can be characterized. During operation, the finger(s) can be identified and then the characteristics of the identified finger(s) can be used with two TOF measurements to determine position.

FIGS. 5A and 5B illustrate detection of a single object. In some examples, however, the acoustic touch sensing system can be configured to detect multiple touches. FIG. 5C illustrates an exemplary acoustic touch sensing system configuration configured to detect multiple touches. The acoustic touch sensing system can include four acoustic transceivers 502A-502D and an active area 504 as described above with respect to FIG. 5A. Instead of one object touching within active area 504, in FIG. 5C two objects can be touching within the active area 504. The two objects, however, can create an ambiguity in the acoustic touch sensing system regarding position of the two objects. The two objects can correspond either to touches 526A and 526B or to touches 526C and 526D. Two of the touches can be actual touches and the other two of the touches can be phantom touches.

For example, TOF measurements can be performed by using transceivers 502A, 502B, 502C, and 502D to determine a distance to the two objects. For example, transceiver 502A can receive two packets of reflected acoustic energy corresponding to the two objects (e.g., as illustrated in FIG. 5E, for example). A first TOF distance to the edge of either touch 526A or touch 526C can be marked by boundary line 530A, and a second TOF distance to the edge of either touch 526B or touch 526D can be marked by boundary line 532A. Likewise, transceiver 502B can be used to determine a boundary line 530B corresponding to touch 526A or touch 526D, and a boundary line 532B corresponding to touch 526B or touch 526C. Transceiver 502C can be used to determine a boundary line 530C corresponding to touch 526B or touch 526C, and a boundary line 532C corresponding to touch 526A or touch 526D. Transceiver 502D can be used to determine a boundary line 530D corresponding to touch 526B or touch 526D, and a boundary line 532D corresponding to touch 526A or touch 526C. Taken together, boundary lines 530A-D and 532A-D can form bounding boxes 538A-D. For example, bounding box 538A can be formed from boundary lines 530A, 530B, 532C, and 532D. Similarly, bounding box 538D can be formed from boundary lines 532A, 530B, 532C, and 530D.

In some examples, the two actual touches can be disambiguated when they are sequential. The first touch can be registered and then the second sequential touch can be disambiguated based on the first touch. For example, in the example illustrated in FIG. 5C, if touch 526A is detected first, then in the subsequent sensing cycle the two touches can be determined to be touches 526A and 526B. In contrast, if touch 526C is detected first, then in the subsequent sensing cycle the two touches can be determined to be touches 526C and 526D. As long as the touches remain far enough apart to be resolved into separate bounding boxes (and assuming the touch contact moves only small amounts between each measurement interval), the two touches can be tracked. In practice, the apparently simultaneous multi-touch by human can be viewed as sequential touches if the acquisition time (measurement cycle) of the acoustic sensors is short enough to register the sequence. Thus, if the sensing cycle repeats frequently enough, the acoustic touch sensing system can disambiguate the multiple touches with four transceivers.

In some examples, e.g., when multiple touches cannot be resolved), bounding box 528 can be used to determine the position of touch. Bounding box 528 can be formed from boundary lines 530A-D.

The multi-touch capabilities described with reference to FIG. 5C can be limited based on the disambiguation requirements (e.g., sequential contact and tracking). In some examples, multi-touch capabilities can be provided by increasing the number of transceivers in the system. FIG. 5D illustrates an exemplary acoustic touch sensing system configuration configured to detect multiple touches. The acoustic touch sensing system in FIG. 5D can include one or more transceivers 542 and 544 arranged along edges of the surface and forming active area 504. Each of the transceivers 542 and 544 can transmit acoustic waves and measure the reflections to determine the presence and location of one or more objects. For example, as illustrated, bounding box 548A can be formed around touch 546A based on TOF measurements from eight transmitters, and bounding box 548B can formed around touch 546B based on TOF measurements from four of the transmitters. Multiple transceivers can also be implemented in place of the two transceivers illustrate in FIG. 5B.

TOF schemes described with reference to FIGS. 5A-5E can provide for a limited number of transceivers, which can simplify the transmitting and receiving electronics, and can reduce time and memory requirements for processing. Although FIGS. 5A-5E discuss using a bounding box based on TOF measurements to determine position of an object, in other examples, different methods can be used including applying matched filtering to a known transmitted ultrasonic pulse shape, and using a center of mass calculation on the filtered output (e.g., instead of a centroid).

In some instances, the touch sensitivity can be affected by one or more properties at the interface of the cover material. For example, when a touch object (e.g., finger) touches the top surface (i.e., surface located closer to the external surface of the device housing) of the cover material, at least one layer of unwanted material (e.g., water, contamination on the finger, gloves covering the finger) can be located between the finger and the top surface of the cover material. The unwanted layer can affect (e.g., decrease) the amplitude of the reflected waves from the finger and/or the unwanted layer. The change in amplitude of the reflected waves can lead to measurement inaccuracies. To maintain or increase the signal-to-noise ratio (SNR) levels, the acoustic touch sensing controller (e.g., acoustic touch sensing controller 210 illustrated in FIG. 2) can increase the voltage used to drive the transmitting transducer (e.g., transducer 504 illustrated in FIGS. 5A-5D), for example. In some instances, variations in the properties of the touch object may also lead to measurement inaccuracies, changes in the voltage and power, changes in SNR levels, or a combination thereof.

Figure 6A:
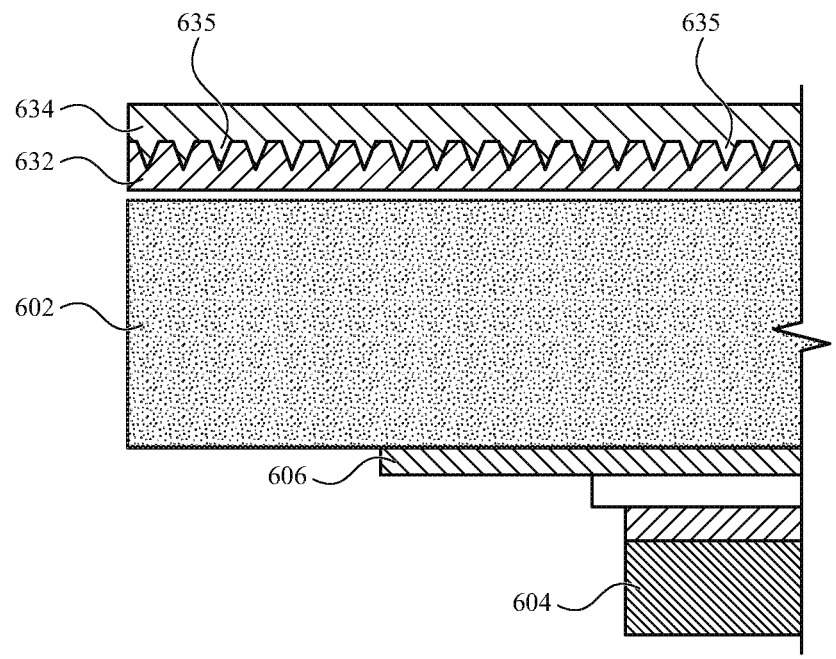
FIGS. 6A-6C illustrate cross-sectional views of a portion of an exemplary acoustic touch sensor including one or more layers disposed on the top surface according to examples of the disclosure.
Figure 6B:
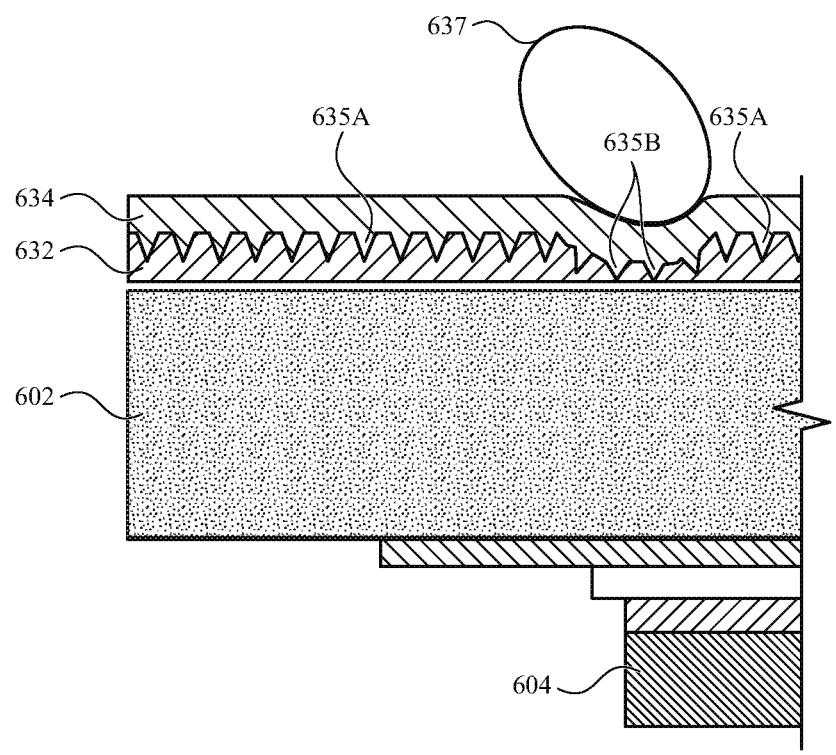

To mitigate the effects from the unwanted layer, the touch sensor can include one or more layers disposed on the top surface of the cover material. FIGS. 6A-6B illustrate cross-sectional views of a portion of an exemplary acoustic touch sensor including one or more layers disposed on the top surface according to examples of the disclosure. The acoustic touch sensor can include a cover material 602, a transducer 604, an opaque mask 606, and other components having the one or more functionalities and/or structures as described above (e.g., discussed in the context of FIGS. 5A-5D). The acoustic touch sensor can further include intermediate layers 632 and 634 located between the cover material 602 and the touch object (not shown in FIG. 6A). Intermediate layer 634 can include a plurality of features 635. Each feature 635 can be any type of protrusion configured to transfer force applied by the touch object to the cover material 602. Intermediate layer 634, plurality of features 635, or both can include any type of material with certain rigidity. Discussed in further details below, the rigidity can be such that force applied by a touch object can be transferred to the intermediate layer 634, while the propagated force can be localized to the area where the touch object contacts the top surface of cover material 602. Exemplary materials for intermediate layer 634 can include, but are not limited to, glass, onyx, and sapphire.

In some examples, the intermediate layer 634 can have a pre-determined thickness. The thickness of intermediate layer 634 can be selected based on the desired amount of propagated force to areas (e.g., areas where plurality of features 635A are located, as discussed below). For example, selecting a thickness greater than the optimal thickness value (e.g., 50-60 microns or 33% thinner than the thickness of cover material 602) can lead to the propagated force extending to areas outside (e.g., larger) than the contact area of the touch object (e.g., touch object 637 illustrated in FIG. 6B). In some instances, the desired amount of propagated force can be based on a desired sensitivity of the acoustic touch sensor to multi-touch detection. As another example, selecting a thickness less than the optimal thickness value can impair the mechanical strength of the intermediate layer 634 and can cause susceptibility to breaking when force from the touch object is applied. As another example, a thickness value can be selected to give a contact area defined by the features 635 of the intermediate layer 634 onto the cover material 602 having approximately the same size as the touch object.

Located between the intermediate layer 634 and cover material 602 can be another intermediate layer 632. Intermediate layer 632 can act to separate the plurality of features 635 from cover material 602 in a no-touch condition, as illustrated in FIG. 6A. In some instances, the intermediate layer 634 may be "floating." In some examples, the separation between the plurality of features 635 and the top surface of cover material 602 can be uniform throughout the touch sensor while in a no-touch condition. In this manner, the plurality of features 635 may have no effect on the acoustic waves. Intermediate layer 632 can include air, a gel, a material that is optically matched to the cover material 602, or the like.

FIG. 6B illustrates the effects on the acoustic touch sensor when force is applied by a touch object to the top surface of the acoustic touch sensor in a touch condition according to examples of the disclosure. Touch object 637 may apply a force to the top surface of the acoustic touch sensor. Intermediate layer 634 can include a plurality of features 635A and 635B. The applied force can cause a change in at least some of the properties of intermediate layer 634. For example, as illustrated in the figure, the force can create one or more local bends in intermediate layer 634 where plurality of features 635B is located. Plurality of features 635B can move closer to cover material 602 and can cause one or more surface discontinuities in cover material 602. Acoustic waves propagating through the cover material 602 can undergo reflections due to the discontinuities located in the path of the wave propagation. Time-of-flight information of the reflected acoustic waves can be measured for purposes of determining the touch location.

The intermediate layer 634 can be configured such that other areas are unaffected (e.g., maintain structural properties) by touch object 637. For example, plurality of features 635A may not undergo movement when touch object 637 applies a force. The absence of movement with plurality of features 635A can confine the areas of the acoustic touch sensor that experience the force transfer, thereby allowing the system the ability to determine the coordinates, properties, and/or shape of the touch.

Including intermediate layers in the acoustic touch sensor can further mitigate the unwanted effects due to variability in the touch object properties. In the absence of the intermediate layer(s), different materials located at the surface of the cover material can cause touch objects to have differing levels of interference with the acoustic waves, which can lead to measurement inaccuracies and unpredictability. For example, the presence of water, contamination, and/or a user wearing a glove may cause the user's fingers to produce vastly different interactions with acoustic waves travelling in the cover material 602. For example, any of the water, contamination, and/or glove can reduce the amount of reflection of acoustic waves propagating in cover material 602 caused by the touch object 637 and the acoustic waves even when the same amount of force is applied under the various different conditions. This reduced reflection can result in a reduced signal received by acoustic touch sensor circuitry, requiring the receive circuitry to have a large dynamic range. By adding the intermediate layer 634 with features 635, the material properties of the material that produces physical conduct with the cover material 602 can remain consistent despite variations in the characteristics of the touch object 637 as described above. Accordingly, the system may be able to detect touch from both a touch object including a contamination layer and a user wearing a glove, for example, without requiring the system to have a large dynamic range.

As another example, unpredictability can result from variations in the spacing of ridges on different users' fingers. To account for the variations in the spacing of ridges, the system can be configured with a range of operability requirements (e.g., transmission frequencies, spatial resolution, etc.) that can increase complexity and production costs of the system. Since the properties of the intermediate layer(s) 632 and 634 and plurality of features 635 may be predetermined and known at the time of manufacture, the reflections of the acoustic waves can be more controlled and predictable. Additionally, the dynamic range of the operability requirements may be reduced.

Figure 6C:
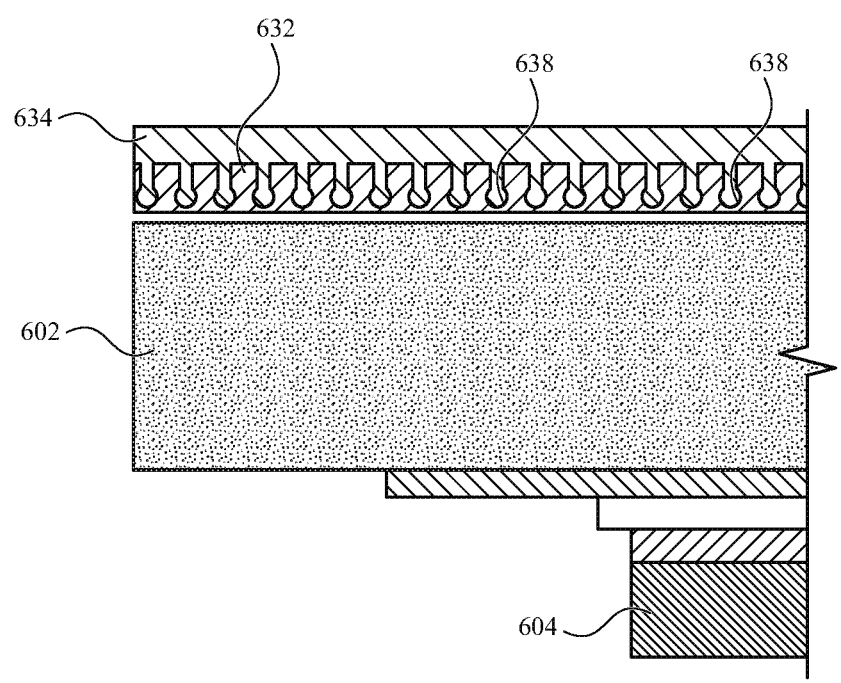

Although FIGS. 6A-6B illustrate the plurality of features as having a triangular or prism shape, examples of the disclosure are limited in shape, size, and/or uniformity. The plurality of features can be any shape including, but not limited to, spheres (e.g., plurality of features 638), as illustrated in FIG. 6C. Each feature can contact (e.g., at one side such as the base of a prism) neighboring features or may be separated (e.g., 600 micron spacing). In some instances, the spacing/pitch of the plurality of features can be determined based on the wavelength(s) of the acoustic waves propagated in the cover material. In some examples, the plurality of features may be non-uniformly distributed throughout the intermediate layer. For example, features may be spaced closer and/or sized (e.g., 5-10 microns diameter) smaller in the center region of the acoustic touch sensor panel relative to the border region.

In some examples, intermediate layer 634 may exclude features in one or more regions of the acoustic touch sensor. Exemplary regions can include regions of the touch sensor susceptible to accidental (or false) touches. For example, the border region may be a region where the user may apply a force due to holding the electronic device in their hand. One or more portions of the border region may exclude features such that the force applied in these one or more portions may not act as a discontinuity to the acoustic waves.

In some examples, the plurality of features can have different structural properties in one direction relative to the other direction (e.g., anisotropic). For example, the features can be rectangular-shaped, where the rectangles, when oriented perpendicular to the transducer 604 can lead to an increase in the measured signal. Rectangles oriented parallel to the transducer 604 can lead to a decrease in the measured signal. In this manner, the orientation of the touch object can be determined.

Although the figures illustrate the intermediate layer(s) as a layer or layers that have been deposited on the cover material, examples of the disclosure can include one or more layers located between the intermediate layers and the cover material. Additionally or alternatively, the intermediate layer(s) can be included in an overlay (e.g., a separate keyboard accessory component) that attaches to the acoustic touch sensor.

Figure 7:
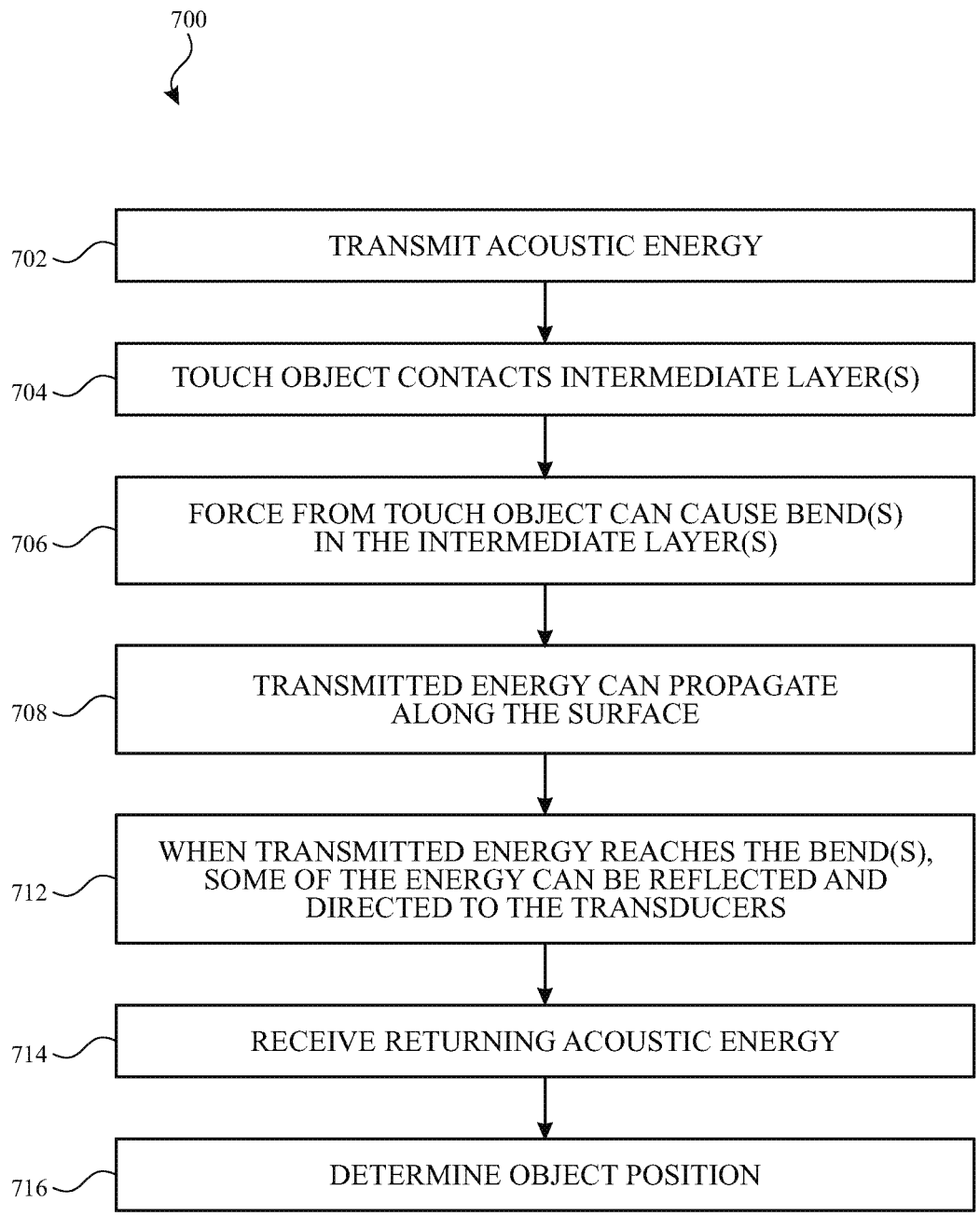
FIG. 7 illustrates an exemplary method 800 for acoustic touch sensing of a touch object contacting the intermediate layer(s) according to examples of the disclosure.

FIG. 7 illustrates an exemplary method 700 for acoustic touch sensing of a touch object contacting the intermediate layer(s) according to examples of the disclosure. At step 702, acoustic energy can be transmitted (e.g., by transducers 604 illustrated in FIGS. 6A-6C) along a surface of a device or through the thickness of a device housing, for example, in the form of an ultrasonic acoustic wave. At step 704, the touch object can contact the intermediate layer(s). At step 706, force from the touch object can cause one or more bends in the intermediate layer. Transmitted energy can propagate along the surface or through the cover material, at step 708. At step 710, when the transmitted energy reaches the one or more bends, some of the energy can be reflected, and a portion of the reflected energy can be directed to the transducers. At step 712, the method 700 can receive returning acoustic energy, and the acoustic energy can be converted to an electrical signal by the transducers. At step 714, the method 700 can determine whether an object is contacting the surface of the device and can further detect the position of one or more objects based on the received acoustic energy. In some examples, a distance of the object from the transmission source (e.g., transducers 604 illustrated in FIGS. 6A-6C) can be determined from a time-of-flight between transmission at step 702 and receiving of reflected energy at step 712 and a propagation rate of the ultrasonic acoustic wave in the material.

An acoustic touch sensor is disclosed. In some examples, the acoustic touch sensor can include a cover material; a transducer coupled to the cover material; one or more layers located on a surface of the cover material, the one or more layers configured to transfer a force applied by an object contacting a surface of a device to the cover material, wherein the device includes the acoustic touch sensor; and control circuitry configured to determine whether the object is contacting the surface of the device. Additionally or alternatively, in some examples, the one or more layers include: a first layer including a plurality of features, and a second layer located between first layer and the cover material. Additionally or alternatively, in some examples, the one or more layers including one or more bends such that some of the plurality of features touch the cover material, wherein the one or more bends create one or more surface discontinuities on the cover material. Additionally or alternatively, in some examples, at least some of the plurality of features of the first layer is configured to transfer the force applied by the object to the cover material, and at least others of the plurality of features of the first layer maintain structural properties when the force is applied by the touch object. Additionally or alternatively, in some examples, the surface of the device including one or more regions capable of being contacted by the object, at least some of the plurality of features are located at the one or more regions, and at least others of the plurality of features are located outside of the one or more regions. Additionally or alternatively, in some examples, the first layer includes one or more other regions that exclude features. Additionally or alternatively, in some examples, the one or more other regions are located at a border region of the device. Additionally or alternatively, in some examples, the first layer includes one or more of glass, onyx, and sapphire. Additionally or alternatively, in some examples, the second layer includes one or more of air and a gel. Additionally or alternatively, in some examples, the plurality of features includes a plurality of prisms. Additionally or alternatively, in some examples, the plurality of features is non-uniformly distributed throughout the first layer. Additionally or alternatively, in some examples, a size of each of the plurality of features is between 5-10 microns. Additionally or alternatively, in some examples, a thickness of first layer is between 50-60 microns. Additionally or alternatively, in some examples, the acoustic touch sensor further comprises: transmit circuitry configured to provide a stimulation signal to the transducer; and receive circuitry configured to capture a received signal based on motion of the transducer, wherein the control circuitry is further configured to: couple the transmit circuitry to the transducer, couple the receive circuitry to the transducer, stimulate the transducer to produce an excitation in the cover material, capture a reflected energy between the transducer and one or more surface discontinuities on the cover material, and determine a location of the object contacting the surface of the device based on the reflected energy.

An electronic device is disclosed. The electronic device can comprise: an acoustic touch sensor including: a cover material; a transducer coupled to the cover material; one or more layers located on a surface of the cover material, the one or more layers configured to transfer a force applied by an object contacting a surface of a device to the cover material, wherein the device includes the acoustic touch sensor; control circuitry configured to determine whether the object is contacting the surface of the device; and a display device, wherein a surface of the cover material is a display screen of the display device.

A method for detecting an object contacting a surface of a device is disclosed. The method can comprise: in accordance with the object contacting the surface of the device: propagating force applied by the touch object at the surface of the device to a surface of a cover material, and creating one or more bends in one or more layers located on the surface of the cover material, the one or more bends creating one or more surface discontinuities on the cover material; transmitting an acoustic wave into a surface of a cover material, the acoustic wave transmitted from a transducer; receiving an acoustic reflection; and determining whether the acoustic reflection corresponds to a signal attenuated by one or more surface discontinuities on the cover material. Additionally or alternatively, in some examples, creating the one or more surface discontinuities includes decreasing a gap between a plurality of features included in the one or more layers and the cover material such that the plurality of features contacts the cover material. Additionally or alternatively, in some examples, the one or more bends and one or more surface discontinuities are located in one or more regions of the device, the method further comprising: maintaining a space between a plurality of features included in the one or more layers and the cover glass outside of the one or more regions. Additionally or alternatively, in some examples, the method further comprises: in accordance with the touch object not contacting the surface of the device: maintaining a uniform spacing throughout the one or more layers, wherein the spacing is between a plurality of features included in the one or more layers and the cover material. Additionally or alternatively, in some examples, the method further comprises: determining a position of the object based on time of flight information.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

What is claimed is:

1. An acoustic touch sensor comprising:
a cover material;
a transducer coupled to the cover material;
an intermediate material having a first surface configured to receive a force applied by an object contacting the first surface of the intermediate material; and a plurality of predetermined protruding features disposed on a second surface of the intermediate material, opposite the first surface, wherein the plurality of predetermined protruding features includes a plurality of prisms, wherein a first set of the plurality of predetermined protruding features located at a first region of the second surface of the intermediate material has a first density, and wherein a second set of the plurality of predetermined protruding features located at a second region of the second surface of the intermediate material has a second density, different than the first density;
a gap between the plurality of predetermined protruding features disposed on the second surface of the intermediate material and the cover material; and
sensing circuitry configured to determine whether the object is contacting the first surface of the intermediate material based on acoustic energy transmitted by the transducer into the cover material and a contact between the protruding features on the second surface of the intermediate material and the cover material,
wherein determining whether the object is contacting the first surface of the intermediate material comprises:
determining that a first protruding feature of the plurality of predetermined protruding features at a first location is contacting the cover material; and
determining that a second protruding feature of the plurality of predetermined protruding features at a second location, different from the first location, is not contacting the cover material.

2. The acoustic touch sensor of claim 1, wherein the touch sensor further comprises:
a second layer located between the intermediate material and the cover material.

3. The acoustic touch sensor of claim 2, wherein the intermediate layer includes one or more bends such that some of the plurality of predetermined protruding features touch the cover material, wherein the one or more bends create one or more surface discontinuities on the cover material.

4. The acoustic touch sensor of claim 2, wherein:
at least some of the plurality of predetermined protruding features of the intermediate layer are configured to transfer the force applied by the object to the cover material, and at least others of the plurality of predetermined protruding features of the intermediate layer are configured to maintain structural properties when the force is applied by the touch object.

5. The acoustic touch sensor of claim 4, the surface of the device including one or more regions capable of being contacted by the object,
at least some of the plurality of predetermined protruding features are located at the one or more regions, and
at least others of the plurality of predetermined protruding features are located outside of the one or more regions.

6. The acoustic touch sensor of claim 2, wherein the intermediate layer includes one or more other regions that exclude features.

7. The acoustic touch sensor of claim 6, wherein the one or more other regions are located at a border region of the device.

8. The acoustic touch sensor of claim 2, wherein the second layer includes one or more of air and a gel.

9. The acoustic touch sensor of claim 1, wherein the intermediate layer includes one or more of glass, onyx, and sapphire.

10. The acoustic touch sensor of claim 1, wherein the plurality of predetermined protruding features is non-uniformly distributed throughout the first layer.

11. The acoustic touch sensor of claim 1, wherein a size of each of the plurality of predetermined protruding features is between 5-10 microns.

12. The acoustic touch sensor of claim 1, wherein a thickness of the intermediate layer is between 50-60 microns.

13. The acoustic touch sensor of claim 1, further comprising:
transmit circuitry configured to provide a stimulation signal to the transducer; and
receive circuitry configured to capture a received signal based on motion of the transducer,
wherein the control circuitry is further configured to:
couple the transmit circuitry to the transducer,
couple the receive circuitry to the transducer,
stimulate the transducer to produce an excitation in the cover material,
capture a reflected energy between the transducer and one or more surface discontinuities on the cover material, and
determine a location of the object contacting the surface of the device based on the reflected energy.

14. The acoustic touch sensor of claim 1, wherein each of the plurality of predetermined protruding features narrows at a constant slope.

15. The acoustic touch sensor of claim 1, wherein a spacing between the plurality of predetermined protruding features is based on a characteristic of the acoustic energy transmitted by the transducer.

16. The acoustic touch sensor of claim 1, wherein a pattern of the plurality of predetermined protruding features is known at manufacture time.

17. A method for detecting an object contacting a first surface of an intermediate layer of a device having the first surface configured to receive a force applied by the object contacting the first surface of the first surface and a second surface, opposite the first surface, having a plurality of predetermined protruding features disposed thereon, wherein the plurality of predetermined protruding features includes a plurality of prisms, wherein a first set of the plurality of predetermined protruding features located at a first region of the second surface of the intermediate material has a first density, and wherein a second set of the plurality of predetermined protruding features located at a second region of the second surface of the intermediate material has a second density, different than the first density, the method comprising:
transmitting an acoustic wave into a surface of a cover material, different from the intermediate layer, wherein the acoustic wave is transmitted from a transducer, wherein a gap is present between the plurality of protruding features the cover material;
receiving an acoustic reflection of the acoustic wave transmitted into the surface of the cover material; and
determining whether the object is contacting a first surface of the intermediate layer, wherein determining whether the object is contacting the first surface of the intermediate material comprises:
determining that a first protruding feature of the plurality of predetermined protruding features at a first location is contacting the cover material; and
determining that a second protruding feature of the plurality of predetermined protruding features at a second location, different from the first location, is not contacting the cover material.

18. The method of claim 17, wherein creating the one or more surface discontinuities includes decreasing a gap between the protruding features and the cover material such that the protruding features contacts the cover material.

19. The method of claim 17, wherein the one or more bends and one or more surface discontinuities are located in one or more regions of the device, the method further comprising:
maintaining a space between the protruding features included on the second opposing surface of the intermediate material and the cover glass outside of the one or more regions.

20. The method of claim 19, further comprising:
in accordance with the touch object not contacting the surface of the device:
maintaining a uniform spacing between the protruding features and the cover material.

21. The method of claim 17, further comprising:
determining a position of the object based on time of flight information.

22. The method of claim 17, wherein each of the plurality of predetermined protruding features narrows at a constant slope.

23. The method of claim 17, wherein a spacing between the plurality of predetermined protruding features is based on a characteristic of the transmitted acoustic wave.

24. The method of claim 17, wherein a pattern of the plurality of predetermined protruding features is known at manufacture time.

25. An acoustic touch sensor comprising:
a cover material;
a transducer coupled to the cover material;
an intermediate material having a first surface configured to receive a force applied by an object contacting the first surface of the intermediate material; and a plurality of predetermined protruding features disposed on a second surface of the intermediate material, opposite the first surface, wherein:
each of the plurality of predetermined protruding features includes a circular feature at an end of a protruding feature;
a first set of the plurality of predetermined protruding features located at a first region of the second surface of the intermediate material has a first density; and a second set of the plurality of predetermined protruding features located at a second region of the second surface of the intermediate material has a second density, different than the first density;

a gap between the plurality of predetermined protruding features disposed on the second surface of the intermediate material and the cover material; and sensing circuitry configured to determine whether the object is contacting the first surface of the intermediate material based on acoustic energy transmitted by the transducer into the cover material and a contact between the protruding features on the second surface of the intermediate material and the cover material, wherein determining whether the object is contacting the first surface of the intermediate material comprises:

determining that a first protruding feature of the plurality of predetermined protruding features at a first location is contacting the cover material; and determining that a second protruding feature of the plurality of predetermined protruding features at a second location, different from the first location, is not contacting the cover material.

* * * * *